United States Patent [19]

Bonforte

[11] 4,302,878

[45] Dec. 1, 1981

[54] CUTTING BLADE

[76] Inventor: Anthony G. Bonforte, P.O. Box 1844, Rancho Santa Fe, Calif. 92069

[21] Appl. No.: 86,715

[22] Filed: Oct. 22, 1979

[51] Int. Cl.³ .......................................... A01D 55/00
[52] U.S. Cl. ..................... 30/347; 56/12.7; 56/295
[58] Field of Search ............... 30/347, 276, 240; 56/295, 12.7

[56] References Cited

U.S. PATENT DOCUMENTS

| | | | |
|---|---|---|---|
| 1,179,434 | 4/1916 | Hunt | 30/240 X |
| 3,343,350 | 9/1967 | Freedlander | 56/295 |
| 3,343,355 | 9/1967 | Freedlander | 56/295 |
| 3,465,508 | 9/1969 | Edwards | 56/295 |
| 3,614,861 | 10/1971 | Wickham | 56/295 |

*Primary Examiner*—Jimmy C. Peters
*Attorney, Agent, or Firm*—Brown & Martin

[57] ABSTRACT

A cutting blade for brush and weed cutting machines and the like includes a unitary body with radially extending cutting arms molded from a durable high strength plastic material consisting of approximately 5% glass fiber embodied in nylon.

5 Claims, 6 Drawing Figures

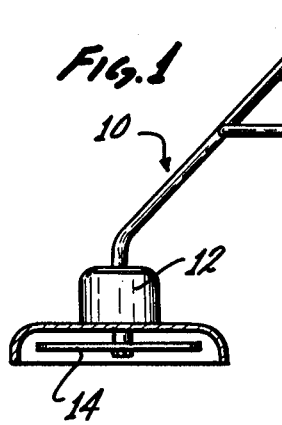
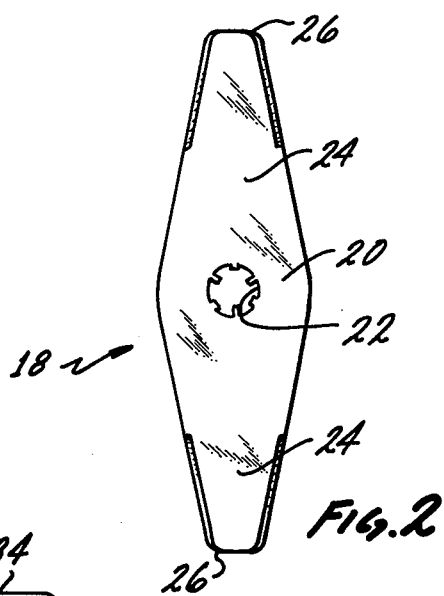
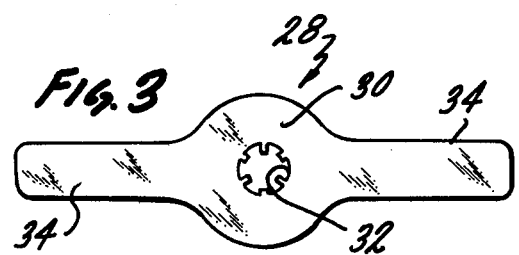
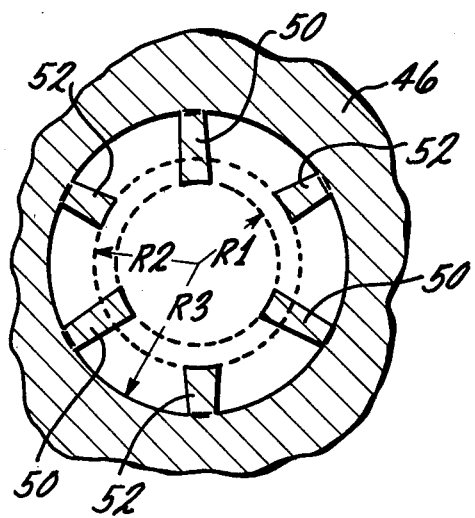
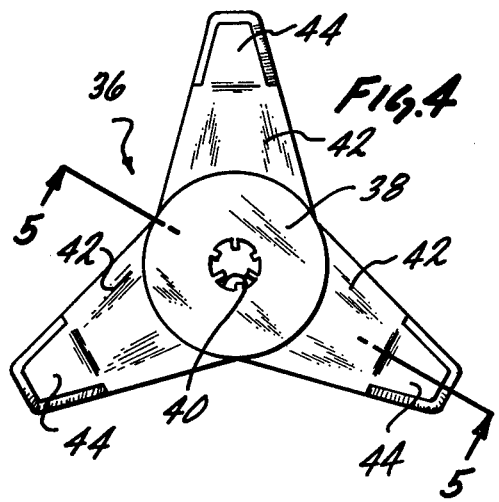
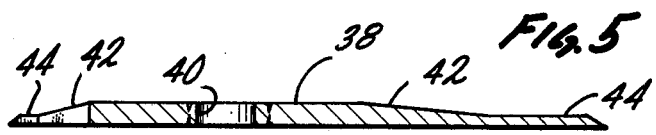

CUTTING BLADE

BACKGROUND OF THE INVENTION

The present invention relates to cutting machines and pertains particularly to cutting blades for brush and weed cutting machines.

Grass, weed and brush cutting machines have been known and widely used in this country for many years. Such machines have in the past normally employed a sharp metal cutting blade that is rotated at high speeds by means of an electric motor or gasoline engine. The rotary blade types are hazardous under certain circumstances. Such blades are hazardous where used around rocks and other extremely hard debris, and particularly when an operator gets careless. The metal blade can shatter rocks and the like or even shatter itself upon engaging a rock, and propel the pieces a great distance.

In recent years cutters for grass and small weeds have been developed which utilize a monofiliment nylon line. These cutters are safer than metal blades and are quire effective for use in cutting and trimming green grass and small weeds. Such devices, however, are ineffective against large weeds and small bushes.

It is therefore desirable that a cutting blade be made available which is highly effective against weeds and small bushes, and yet relatively non-hazardous.

SUMMARY AND OBJECTS OF THE INVENTION

It is the primary object of the present invention to overcome the above problems of the prior art.

Another object of the invention is to provide an effective and inexpensive cutting blade for rotary powered weed and brush cutting machines.

In accordance with the primary aspect of the present invention a cutting blade for rotary weed and brush cutting machines is constructed of a plastic material that is highly durable and effective for cutting of weeds and brush, yet relatively safe for use around rocks and the like.

BRIEF DESCRIPTION OF THE DRAWING

The above and other objects and advantages of the present invention will become apparent from the following description when read in conjunction with the drawing wherein:

FIG. 1 is a perspective view of a cutting machine employing a blade in accordance with the invention.

FIG. 2 is a plan view of a blade in accordance with the invention.

FIG. 3 is a plan view of an alternate embodiment.

FIG. 4 is a plan view of a further embodiment.

FIG. 5 is a sectional view taken on lines 5—5 of FIG. 4.

FIG. 6 is a detailed view of the mounting bore of the blade.

DETAILED DESCRIPTION OF A PREFERRED EMBODIMENT

Turning to the drawings, there is illustrated in FIG. 1 a machine that is designated generally by the numeral 10 of the type frequently employed for cutting weeds, grass and small brush. The machine includes a prime mover 12 which may be either electrical or gasoline powered. A rotary blade 14 is mounted on the shaft of the prime mover and rotates at a high speed for cutting grass, weeds, small brush and the like. The machine includes a handle 16 and is manipulated by an operator by means of the handle and the controls thereon.

Heretofore, such machines have employed either a sharpened steel cutting blade or a monofiliment line. The present invention provides a construction that is more effective than the monofiliment line, yet safer than the steel cutting blades of the prior art.

Turning to FIG. 2 of the drawing there is illustrated a blade 18 in accordance with the invention, having a central hub portion 20 having a bore 22 for receiving and fitting on the shaft of a cutting machine. The blade includes a pair of outwardly extending arms or cutting blade members 24, each of which has a blunt outer end and a radius of curvature transition at 26 between the cutting edge and the outer end. The cutting edge extends in a substantially straight line from a position at the outer radius of the hub to the outer end at an angle of about 12 to 17 degrees from the radial. A 0.25 inch radius transition from the cutting edge to the blunt end is provided. It has been found that this is an optimum radius for maintaining the initial configuration of the blade under wear.

The thickness of the blade has also been found to be somewhat critical in accomplishing the results. The blade is a molded one-piece blade molded from a nylon having a filling of approximately 5% of glass fiber and the remaining percent of special nylon. A nylon found to be suitable is that available from the Dupont Company under the trademark Zytel ST 801 nylon. This provides a high strength, durable plastic blade that has a high strength and durability and is effective to cut weeds and small brush. A blade of this construction will withstand the forces necessary to cut brush and at the same time reduce or eliminate the hazards of steel cutting blades.

The blade has a preferred thickness of approximately 3/32 of an inch, which has been found to be the most efficient, and will have a reasonable life and essentially maintain an effective cutting edge throughout the life of the blade. The blade is preferably reversible such that the blade can be simply reversed on the shaft and utilized without any further alterations thereof. It has been found that the thickness above described for a blade of this type, although initially molded with a sharpened edge, essentially needs no further sharpening during the life of the blade. This construction and these dimensions are for a blade ranging in size from about six to twelve (6–12) inches (about 15 to 30 centimeters) in length.

Turning to FIG. 3 there is illustrated an alternate embodiment 28 of the two armed cutting blade having a central hub 30 with a shaft receiving bore 32, and a pair of cutting blade arms 34 extending radially outward from the hub 30. As in the previous embodiment, the blades have a blunt outer end and a straight cutting edge; however, the cutting edges extend substantially parallel outward from the central hub as opposed to the tapered arms of the previous embodiment. As in the previous embodiment, a 0.25 inch, or quarter of an inch (approximately 0.635 centimeters) radius transition from the cutting edge to the outer blunt edge is provided. Similarly, the thickness of the blade is provided at approximately 3/32 of an inch in order to maintain the effectiveness of the cutting edge without the requirement of sharpening during the lifetime of the blade. The blades with this construction are essentially self sharpening and maintain a suitable cutting edge during the lifetime thereof. Such blades have been found to be effective to cut weeds and small brush.

Turning to FIG. 4 of the drawings, there is illustrated a three armed cutting blade 36 having a central hub 38 with a shaft receiving bore 40 and three identical cutting arms 42 extending radially outward therefrom. As in the previous embodiment, these blades have a straight cutting edge extending outward tangentially from the outer radius of the hub at about an angle of between 12 and 17 degrees from the radial to a blunt outer end and a transition from the cutting edge to the blunt outer end. With a blade of this type adapted for use on larger machines, such as larger brush cutters and the like, the blade is formed with a thick hub portion of approximately ¼ inch and a tapered arm portion tapering down to a cutting blade portion 44 of approximately 0.125 or ⅛ of an inch. As in the previous embodiment, the dimensions or thicknesses are critical in maintaining a cutting edge. While the blade is provided with an initial cutting edge, the edge is quickly somewhat blunted due to the material of construction. The maintenance of a thickness such as above described will insure that the cutting portion of the blade maintains a substantially effective cutting edge throughout the life of the blade.

The optimum range of thickness for the cutting blade has been found to be approximately within the range of from 0.05 to 0.15 inches in thickness. The optimum thickness has been found to be approximately 0.095 in thickness to maintain a good cutting edge and a reasonable wear life of the blade. This is for the smaller two armed blades which preferably range in size from six (6) inches to a maximum of twelve (12) inches.

The three bladed or armed blade ranges in size of from 10 to 16 inches in diameter and is designed primarily for heavy brush cutting. The thickness of the cutting blade portion is found to be preferably on the order of 0.125 inches in thickness and have a slightly bevelled cutting edge. With a construction of this specified form, the blade has been found to be effective yet maintain substantially that form of cutting edge.

Another feature of the invention which is found to be quite effective with the present invention is the multiple diameter shaft adaption bore hole as illustrated in FIG. 6. A blade member 40 is provided with a bore hole 48. This bore hole is initially produced with a plurality of generally wedge or trapizoidal shape inwardly extending abutment or sizing members. A first group of the members (e.g. three in number) 50 are equally spaced around the walls of the bore and extend inwardly to a first position for fixing a shaft having a first radius R-1. A second group of the members 52 are also spaced around the bore and extend inward to a position for fitting a second shaft having a radius R-2. These first and second members are easily removable to permit the blade to fit a shaft of the bore radius R-3. With the specified material and construction these members can be quickly and easily removed simply by grasping with a pair of pliers or the like and tearing the abutment members from the bore. This provides a blade that can fit multiple sized shafts, depending on which abutments or sizing devices are used.

While I have illustrated and described my invention by means of specific embodiments, it is to be understood that numerous changes and modifications can be made therein without departing from the spirit and scope of the invention as defined in the appended claims.

Having described my invention, I now claim:

1. A unitary one-piece cutting blade molded from a durable high strength plastic material and comprising:
   a unitary blade body constructed of durable nylon having a central generally planar hub having an axis of rotation and outer radius, and a co-axially disposed shaft receiving bore for mounting on a rotatable shaft; and
   a plurality of cutting arms extending outward from said hub and each arm having a pair of opposed generally straight edges extending tangentally from the outer radius of the hub to the outer end thereof at an angle of from about 12 to 17 degrees from a radial line through the axis tapering downward toward the tip, at least one of said edges being a cutting edge.

2. The blade of claim 1, wherein said hub is a first thickness and the cutting portion of said arm is approximately ½ the thickness of said hub.

3. The blade of claim 1 wherein said material is approximately five percent glass fiber.

4. A unitary one-piece cutting blade molded from a durable high strength plastic material and comprising:
   a unitary blade body constructed of durable nylon having a central generally planar hub having an axis of rotation and outer radius, and a co-axially disposed shaft receiving bore for mounting on a rotatable shaft including a first plurality of tabs having a first length and a second plurality having a second length extending from the walls of said bore inwardly toward the axis thereof, for altering the effective size of the bore for fitting multiple size shafts and;
   a plurality of cutting arms extending outward from said hub and having a generally straight cutting edge extending tangentally from the outer radius of the hub substantially to the outer end thereof at an angle of from about 12 to 17 degrees from a radial line through the axis.

5. The blade of claim 4 wherein said arms each include a pair of opposed straight edges extending tangentally from the outer radius of the hub.

* * * * *